Figure 1:
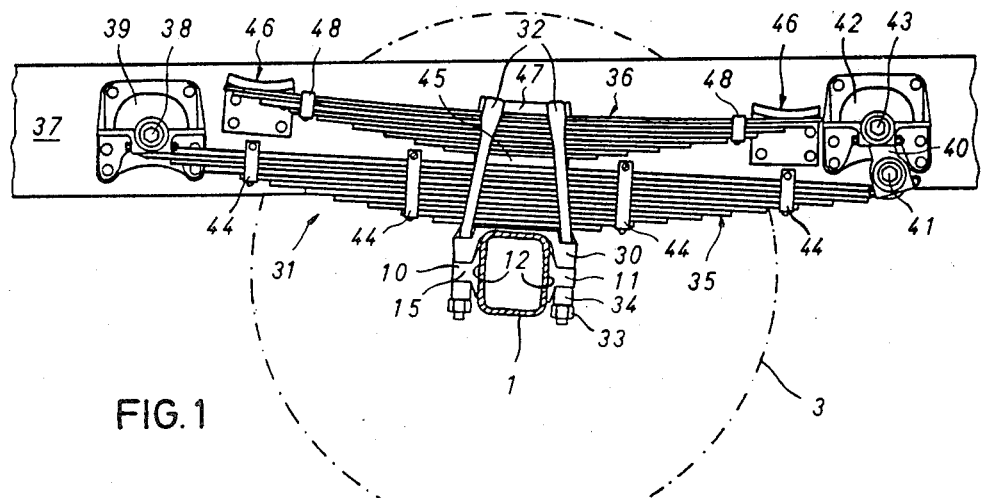

United States Patent [19]

Nordström

[11] 4,227,716
[45] Oct. 14, 1980

[54] ARRANGEMENT FOR ATTACHING SPRING ASSEMBLIES TO VEHICLE AXLE HOUSINGS

[75] Inventor: Sigurd A. M. Nordström, Södertälje, Sweden

[73] Assignee: Saab-Scania Aktiebolag, Södertälje, Sweden

[21] Appl. No.: 971,062

[22] Filed: Dec. 19, 1978

[30] Foreign Application Priority Data

Dec. 22, 1977 [SE] Sweden ............................... 7714636

[51] Int. Cl.³ ............................................. B60G 19/02
[52] U.S. Cl. ..................................... 280/719; 267/52
[58] Field of Search .................. 267/52; 280/719, 718, 280/720

[56] References Cited

U.S. PATENT DOCUMENTS

| | | | |
|---|---|---|---|
| 1,292,611 | 1/1919 | Jones | 267/52 |
| 2,191,941 | 2/1940 | Reid | 280/718 |
| 2,517,940 | 8/1950 | Stuart | 280/719 X |
| 3,058,740 | 10/1962 | Harbers | 267/52 |
| 3,580,347 | 5/1971 | McGee | 280/718 X |

Primary Examiner—John J. Love
Assistant Examiner—Norman L. Stack
Attorney, Agent, or Firm—Cushman, Darby & Cushman

[57] ABSTRACT

An arrangement for attaching a spring assembly to an axle housing 1 in vehicles. At least two housing brackets 10, 11 are rigidly mounted on the front and the rear of an axle housing 1 for supporting a spring retaining seating 30 which is contacting the housing brackets 10, 11 from above or from below. U-bolts 32 are used to clamp a spring assembly against the seating 30 and to clamp the seating 30 against the housing brackets 10, 11. Each housing bracket 10, 11 has a baseplate 12 welded to the axle housing 1 and also has at least one supporting portion 15 that projects from the baseplate 12 and is provided with support planes 16, 17 for the spring retaining seating 30.

12 Claims, 5 Drawing Figures

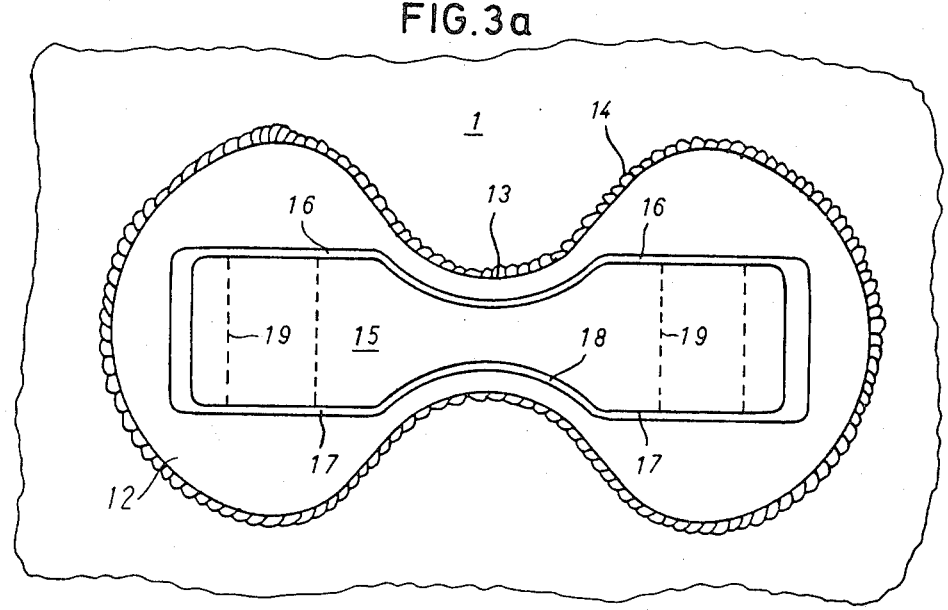
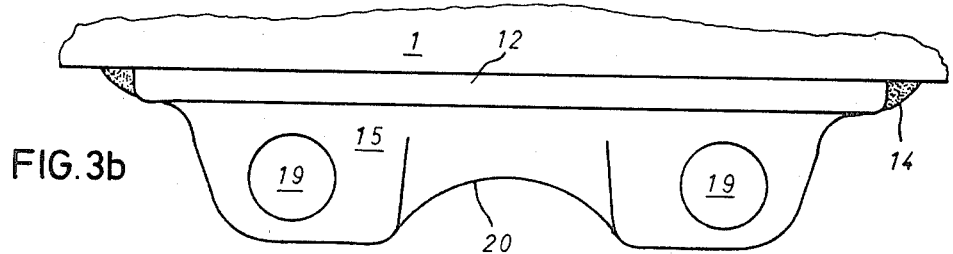
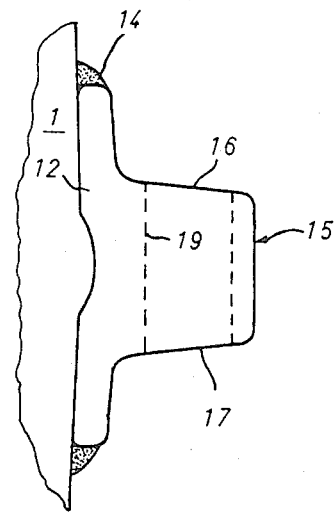

ARRANGEMENT FOR ATTACHING SPRING ASSEMBLIES TO VEHICLE AXLE HOUSINGS

The present invention relates to an arrangement for attaching a spring assembly to an axle housing in vehicles, preferably the rear axle housing of a lorry, said spring assembly being attached to the vehicle frame or body and via a spring retaining seating or the like being removably secured to housing brackets rigidly mounted on the front and rear side surfaces of the axle housing, said spring retaining seating and housing brackets being provided with through-holes for U-bolts which by means of conventional clamping means acting on the housing brackets clamp the spring retaining seating and the spring assembly to the axle housing.

For the purpose of attaching a conventional leaf spring assembly to a back axle housing of a heavy vehicle, e.g. a lorry, it is customary to use U-bolts going round all the leaves in the spring assembly as well as a back axle housing made from cast iron. It is also customary to use another type of attachment for the spring assembly when the back axle housing is made up from welded plates. In such cases the leaf spring assembly is clamped by the U-bolts to a spring retaining seating welded to the back axle housing. In this case the seating is mounted across the axle housing and is welded to the front and rear sides thereof.

Both these types of spring attachment arrangements have certain disadvantages, however. A back axle housing must be solidly made for deformation from loads to be as small as possible. Apart from the forces caused by operation of the vehicle, the back axle housing must also take up the clamping forces caused by the U-bolts. The result of this is that the back axle housing must be dimensioned for large stresses. The disadvantage of a back axle housing made from cast iron is that it will be large and heavy and sensitive to impacts.

A back axle housing made from plate will stand rougher treatment than one made from cast iron, and consequently such axle housings can be given dimensions making them lighter and smaller than those made from cast iron. With a back axle housing made from plate relatively large stresses are, however, obtained at the upper and lower surfaces of the axle which make it unsuitable to weld a spring retaining seating to the axle housing at these places. For this reason, the spring retaining seating is usually formed with planes directed downwards towards the side surfaces of the axle housing, said planes being welded to the front and rear side surfaces of the axle housing running by means of weld along a part of the respective plane. A large proportion of the load between the leaf spring assembly and the vehicle wheels is transferred via these weld joints, thus subjecting them to large stresses, which can cause the formation of cracks in the upper portion of the welds.

The present invention has the object of eliminating said disadvantages and relates to an attachment arrangement substantially distinguished in that each individual housing bracket is formed with a baseplate from which projects at least one supporting portion having an upper and a lower support plane, and in that each housing bracket having its baseplate contacting the axle housing is secured to the axle housing by means of a weld extending substantially round the whole of the periphery of the baseplate.

The invention is further distinguished in that each individual housing bracket is symmetrical relative to two different central planes oriented at right angles to each other.

Further characterizing features for the invention are apparent from the accompanying claims and are also set forth in the conclusion of the description below.

The inventive spring attachment arrangement is especially suitable for heavy vehicles, and an embodiment exemplifying the invention will therefore be described below for a spring attachment arrangement at the back axle housing on a heavy lorry.

Figure 2:
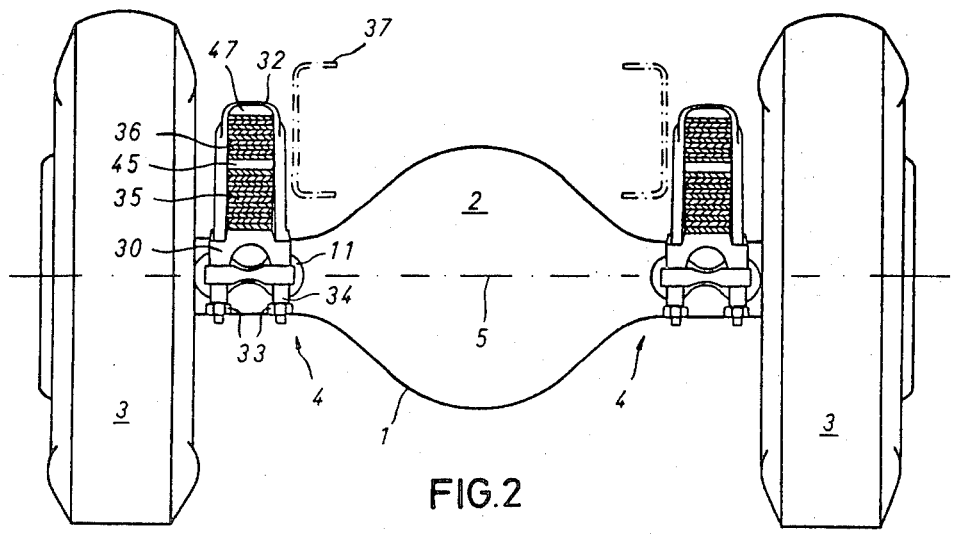

The invention will now be described while referring to the accompanying drawings, on which FIG. 1 is a side view of a spring attachment arrangement, FIG. 2 is a rear view of the spring attachment arrangement according to FIG. 1, and FIGS. 3a, 3b and 3c show a bracket included in the spring attachment arrangement according to FIGS. 1 and 2, seen from behind, from above and from one side, in the axial direction of the back axle.

A back axle housing 1, welded up from pressed plates, for a lorry, includes in a central portion a differential gear housing 2. Mounting means (not shown) for wheel hubs and vehicle wheels 3 are conventionally arranged at both outer ends of the back axle housing 1. There are spring attachment means 4 arranged symmetrically on either side of the differential gear housing 2 at the same level as the horizontal centre axis 5 of the back axle housing. Each of the means 4 includes two housing brackets 10,11 attached by baseplates 12 to the front and back sides of the back axle housing 1. Such a baseplate 12 is comparatively large, and its configuration is substantially similar to the mathematical sign of infinity, with semi-circularly formed end portions, smooth curves reducing the baseplate by more than half to a waist 13. Each housing bracket 10,11 is, along the edge of the baseplate, welded to the back axle housing 1 by means of a continuous welding run 14.

Each housing bracket 10,11 is formed with a projecting horizontal portion 15 provided with an upper and a lower support plane 16,17. The portion 15 is also formed with a narrow waist 18 in the same position as the narrow waist 13 on the baseplate 12 of the housing bracket 10,11, and in the horizontal plane the narrow waist on the portion 15 is also provided with a curved recess 20. Each of the portions 15 is also provided with two through-holes 19, one on either side of the narrow waist 18.

A spring retaining seating 30 disposed transverse to the axle 1 rests against the upper support planes 16 on either housing bracket 10,11, and there is a leaf spring assembly 31 clamped against the upper side of the seating 30 by means of two U-bolts 32. The ends of the bolts are threaded and are freely accommodated in the holes 19 in the seating 30 and in the housing brackets 10,11. By means of nuts 33 on the free ends of the U-bolts 32, the latter are tightened against the lower support planes 17 on the housing brackets 10,11, via a spacer sleeve 34 on each of the ends of the U-bolts. Above the seating 30, the U-bolts 32 slope towards each other and each embraces the leaf spring assembly.

The leaf spring assembly 31 clamped to the back axle 1 comprises a main spring assembly 35 and an auxiliary spring assembly 36. The main spring assembly 35 is kept together conventionally by four shackles 44 and is connected to the chassi beam 37 of the vehicle by means of a so-called Hotchkiss suspension. This signifies that the main spring assembly 35 is mounted at its forward end on a forward spring bolt 38 and that the back end of the main spring assembly 35 is mounted in a shackle 40 by means of a shackle bolt 41. The forward spring bolt 38 is fastened to a forward spring attachment 39, and the shackle 40 is fastened to a rear spring attachment 42 by means of a spring bolt 43. Both spring attachments 39,42 are fastened to the chassi beam 37 by means of bolt joints. As previously mentioned, the leaf spring assembly also comprises an auxiliary spring assembly 36 mounted above the main spring assembly 35, the two spring assemblies being separated by means of a spacer 45. The auxiliary spring assembly 36 is conventionally kept together by two clamps 48. A guide plate 47 is disposed on top of the auxiliary spring assembly 36 an is provided with recesses for the U-bolts 32. A conventionally arranged central bolt (not shown) runs through the guide plate 47, auxiliary spring assembly 36, spacer 45 and main spring assembly 35 to keep these parts together in one unit. The central bolt also facilitates location of this unit on the spring retaining seating 30, since the head of the bolt projects somewhat below the main spring assembly 35 for accommodation in a complementary recess (not shown) in the seating 30.

Normally, the auxiliary spring assembly 36 assumes an inactive position, but if the vehicle is heavily loaded, the forward and back ends of the auxiliary spring assembly 36 will engage against brackets 46 bolted to the chassis beam 37. The brackets are formed with a cylindrical bearing surface facing towards the auxiliary spring assembly 36 and allow deflection of the auxiliary spring assembly 36 as load is taken up.

The inventive spring attachment assembly 4 on an axle housing 1 has several substantial advantages. The expedient of forming the baseplates 12 of the housing brackets 10,11 with a narrow waist 13 results in that the housing brackets 10,11 will be relatively weak from a torsional point of view, signifying that they can easily accompany the axle housing 1 in its elastic torsional movements. The welds 13 are thus not subjected to extra loads. Symmetrical configuration of the respective housing brackets 10,11 and their baseplates 12 enables attachment to the back axle housing 1 by means of an endless weld 14 without abrupt stress concentrations. The location of the housing brackets 10,11 on the forward and rear sides, respectively, of the back axle housing in the vicinity of its horizontal central axis 5 is also advantageous with respect to the stress conditions to which the back axle housing is subjected when the vehicle is driven. In the vicinity of the central axis 5, the internal stresses are minimal, the welded joint thus not being notably affected by interior stresses in the back axle housing 1.

Said location of the housing brackets 10,11 has also large advantages from the point of view of standardization. Certain back axle suspensions are formed with spring assemblies mounted under the back axle housing. With a back axle housing provided with the inventive attachment means, a spring retaining seating and a spring assembly can just as well be placed under the back axe housing as above it. It is thus possible to use the same back axle housing for alternative types of spring suspension, which is advantageous both from the point of view of manufacture and stock-keeping.

The inventive spring attachment means is especially advantageous for lorries, as has been discussed above, but within the scope of the following claims, the invention is not limited solely to this type of vehicle but can be modified in alternative embodiments for use on other kinds of vehicles, e.g. buses, passenger cars, wagons and work machines. Neither is the springing system mentioned in the claims nor the springing means incorporated therein restricted solely to leaf springs, but the designations used can just as well relate to helical springs, air springs or other spring means.

What I claim is:

1. Arrangement for attaching a spring assembly to an axle housing in vehicles, preferably the rear axle housing of a lorry, said spring assembly being attached to the vehicle frame or body and via a spring retaining seating or the like being removably secured to housing brackets rigidly mounted on the front and rear side surfaces of the axle housing, said spring retaining seating and housing brackets being provided with through-holes for U-bolts which by means of conventional clamping means acting on the housing brackets clamp the spring retaining seating and the spring assembly to the axle housing via the housing brackets, characterized in that each individual housing bracket is formed with a baseplate from which projects at least one supporting portion having an upper and a lower support plane, and in that each housing bracket having its baseplate contacting the axle housing is secured to the axle housing by means of a weld extending substantially round the whole of the periphery of the baseplate.

2. Arrangement as claimed in claim 1, characterized in that each individual housing bracket is symmetrical relative to two different central planes oriented at right angles to each other.

3. Arrangement as claimed in claim 2, characterized in that each individual housing bracket is secured to the axle housing so that its horizontal axis of symmetry is at the same level as the horizontal centre line of the axle housing.

4. Arrangement according to claim 3, characterized in that for attaching a leaf spring assembly the axle housing is provided with at least one forward housing bracket and at least one rear housing bracket.

5. Arrangement according to claim 4, characterized in that each housing bracket is provided with supporting planes arranged in pairs, on the upper and lower side of the supporting portion, respectively, said supporting portion having two through-holes opening in said supporting planes.

6. Arrangement according to claim 4 or 5, characterized in that the baseplate on each housing bracket, as seen in a horizontal direction, is formed with semi-circular end portions smoothly connected by an intermediate waist to form a configuration similar to the mathematical symbol for infinity.

7. Arrangement according to claim 6, characterized in that the supporting portion, as seen in a horizontal direction, is formed with a central waist.

8. Arrangement according to claim 7, characterized in that the supporting portion, as seen in a horizontal plane, is formed with an accurate central recess at said waist.

9. Arrangement according to claim 5 or 8, characterized in that the spring retaining seating is yoke-shaped in order to embrace the axle housing from above or from below and to contact the supporting planes on the housing brackets.

10. Arrangement according to claim 9, characterized in that two U-bolts pass through the spring retaining seating and respective housing bracket on either side of the axle housing, said U-bolts extending essentially parallel to each other, and in that those portions of the U-bolts embracing the spring assemblies are inclined relative to each other.

11. In a leaf-spring connecting assembly for connecting a leaf-spring assembly to a vehicle axle housing having front and rear surfaces: separate front and rear mounting brackets each of which includes a baseplate contacting and welded to the front and rear axle housing surfaces by welds which extend substantially around the peripheries of the baseplates, the front bracket having a supporting projection extending forwardly from the respective baseplate and the rear bracket having a supporting projection extending rearwardly from the respective baseplate, each of said supporting portions having an upper and a lower support plane; a removable spring retaining seating extending transversely of the axle housing and having portions engaging one of the support planes of each supporting projection; for each mounting bracket a U-bolt having end portions extending through generally vertical holes in the spring retaining seating and through holes in the supporting projection of each mounting bracket and having a central portion which passes around the leaf spring assembly and clamps the leaf spring assembly to the seating and the seating to the respective supporting bracket; and clamping means gripping the ends of said U-bolt and lying against the other support plane of each supporting projection.

12. Apparatus as in claim 11 wherein each baseplate as seen in a horizontal direction transverse to the axle housing has semi-circular end portions smoothly connected by an intermediate waist to form a configuration similar to the mathematical symbol for infinity.

* * * * *